United States Patent
Scherch

[19]

[11] Patent Number: 6,024,637
[45] Date of Patent: Feb. 15, 2000

[54] CONVEYOR FOR COAGULATING THE OUTER SURFACE OF A SAUSAGE STRAND DISCHARGED FROM A SAUSAGE EXTRUDING MACHINE

[75] Inventor: Richard P. Scherch, Johnston, Iowa

[73] Assignee: Townsend Engineering Company, Des Moines, Iowa

[21] Appl. No.: 08/835,708

[22] Filed: Apr. 10, 1997

[51] Int. Cl.[7] .................................................. A22C 15/00
[52] U.S. Cl. ......................... 452/177; 452/178; 198/850; 198/853
[58] Field of Search .................................... 452/177, 178; 198/643, 688.1, 690.2, 699.1, 850, 851, 853

[56] References Cited

U.S. PATENT DOCUMENTS

| | | |
|---|---|---|
| 1,794,182 | 2/1931 | Kunz . |
| 3,521,322 | 7/1970 | Michael et al. .......................... 452/177 |
| 3,945,487 | 3/1976 | Norton . |
| 4,611,710 | 9/1986 | Mitsufuji ............................ 198/803.01 |
| 5,053,239 | 10/1991 | Vanhatalo et al. ....................... 426/412 |
| 5,064,400 | 11/1991 | Stipe ............................................ 452/2 |
| 5,213,203 | 5/1993 | Kinney et al. ........................... 198/850 |
| 5,507,383 | 4/1996 | Lapyere et al. .......................... 198/853 |
| 5,554,401 | 9/1996 | Alexander et al. .................. 426/277 X |

Primary Examiner—Willis Little
Attorney, Agent, or Firm—Zarley, McKee, Thomte, Vorhees & Sease

[57] ABSTRACT

A conveyor for moving an extruded strand of sausage from an extruding machine for coagulating the outer surface of said strand of sausage has a frame, a continuous conveyor on the frame sloping downwardly from a point of beginning to a discharge station, and thence back to the point of beginning, a brine fluid circuit disposed on the frame above the conveyor with a plurality of discharge nozzles thereon to spray brine on a strand of sausage moving with the conveyor, the conveyor being comprised of a plurality of link elements pivotally secured together, each link element having a generally flat supporting surface, the supporting surface having a plurality of protruding support elements thereon with liquid channels therebetween so that the strand of sausage can have a lower surface supported by a plurality of laterally extending elements whereupon brine fluid in the channels can contact the lower surface of the strand of sausage above the channels.

4 Claims, 4 Drawing Sheets

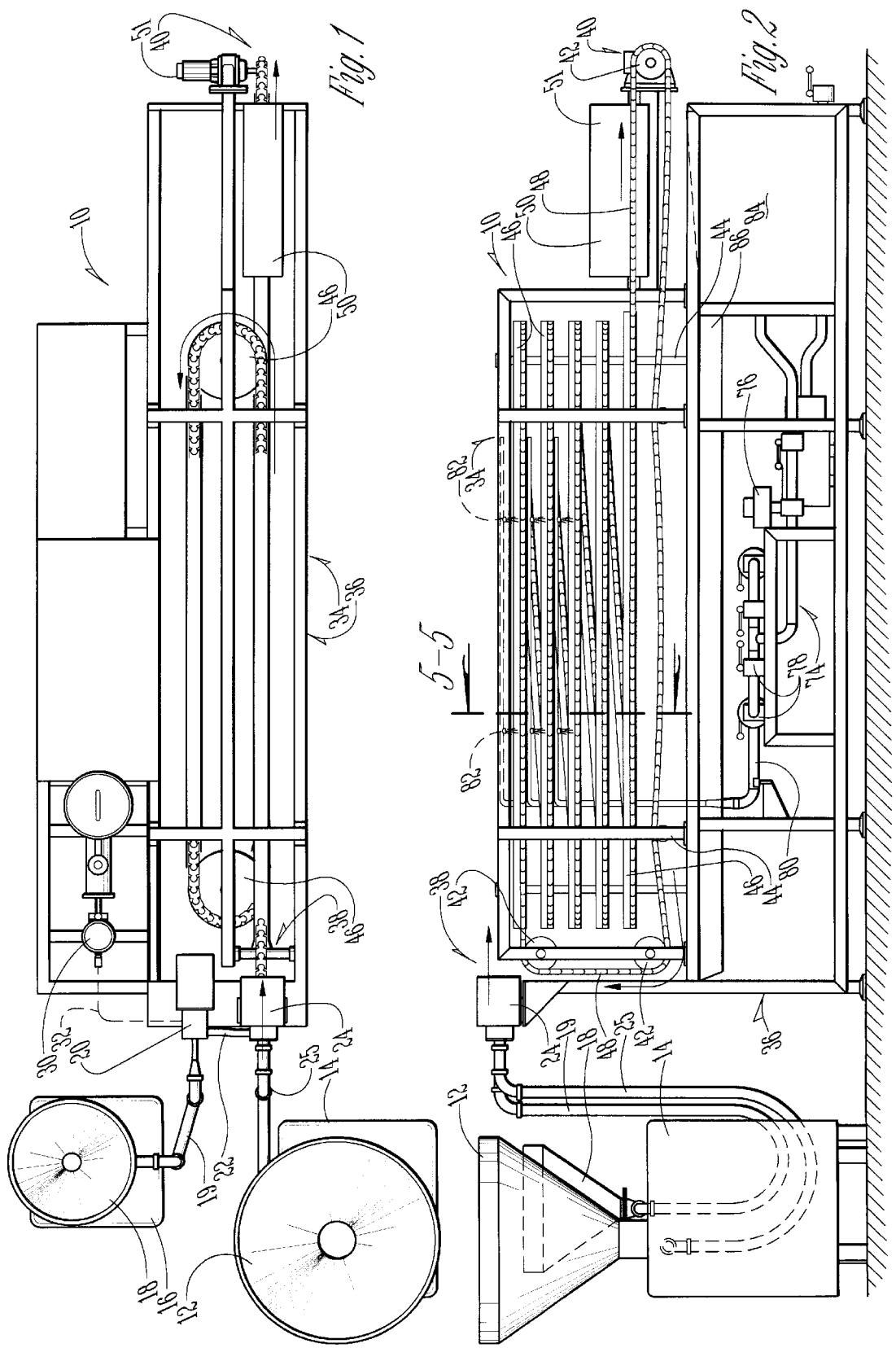

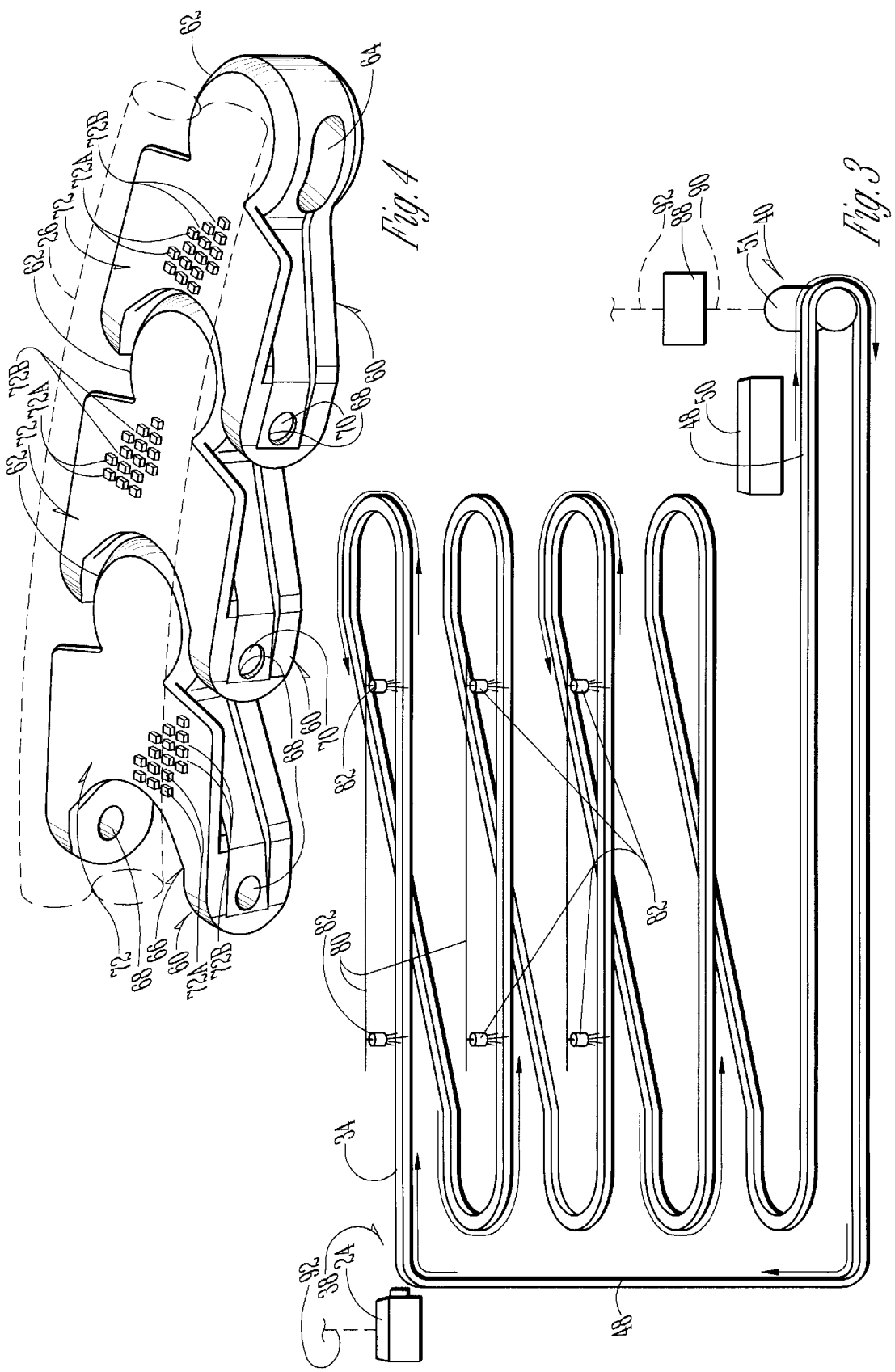

CONVEYOR FOR COAGULATING THE OUTER SURFACE OF A SAUSAGE STRAND DISCHARGED FROM A SAUSAGE EXTRUDING MACHINE

BACKGROUND OF THE INVENTION

In recent times, it has become known to coextrude a strand of sausage material which has an inner core of meat emulsion having an outer surface material that can be coagulated to provide an encasement for the strand. The coagulation normally includes subjecting the extruded strand to a brine solution. The brine is applied immediately after the strand is extruded.

The brine is sometimes sprayed onto the sausage strand as the strand is moved along an elongated conveyor which is comprised of a plurality of pivotally interconnected links that have a relatively flat supporting surface. One shortcoming of these links is that the bottom of the strand engaging the flat supporting surfaces of the links is not well exposed to the brine, whereupon the bottom surface of the strand is not well coagulated.

It is therefore a principal object of this invention to provide a conveyor for coagulating the outer surface of a sausage strand discharged from a sausage extruding machine wherein the sausage strand will be elevated from the supporting surface of the conveyor links so as to be exposed to the brine solution sprayed on the sausage strand.

A further object of this invention is to provide a conveyor for coagulating the outer surface of a sausage strand discharged from a sausage extruding machine which will permit the entire sausage surface to engage brine sprayed on the sausage strand from a plurality of positions along the length thereof.

These and other objects will be apparent to those skilled in the art.

SUMMARY OF THE INVENTION

The sausage strand is extruded onto a belt or conveyor and carried through a brine shower system for about 40 seconds. The brine is sprayed through nozzles onto the sausage while traveling on the belt. The sausage is turned several times during the shower to enhance even brine distribution. The conveyor is comprised of a plurality of links which have a flat supporting surface interrupted by a plurality of spaced protrusions which channels therebetween to permit brine to fill the channels and to engage the bottom surface of the sausage strand supported on the protrusions.

The belt is a Multi-Flex chain made from Acetal plastic. The links are secured with stainless steel pins. Twenty four meters of belt running on four tiers provide the brine shower dwell time that is required. The improvement of this invention is a modification of the supporting surface of the links.

BRIEF DESCRIPTION OF THE DRAWINGS

FIG. 1 is a plan view of the sausage extruder unit and the associated conveyor;

FIG. 2 is a side elevational view thereof as viewed from the bottom of FIG. 1;

FIG. 3 is a schematic view of the conveyor unit;

FIG. 4 is an enlarged scale perspective view of the conveyor belt;

DESCRIPTION OF THE PREFERRED EMBODIMENT

The term "sausage" as used herein refers to any type of emulsified meat product that is formed into sausage or frankfurter links or the like.

Figure 5:
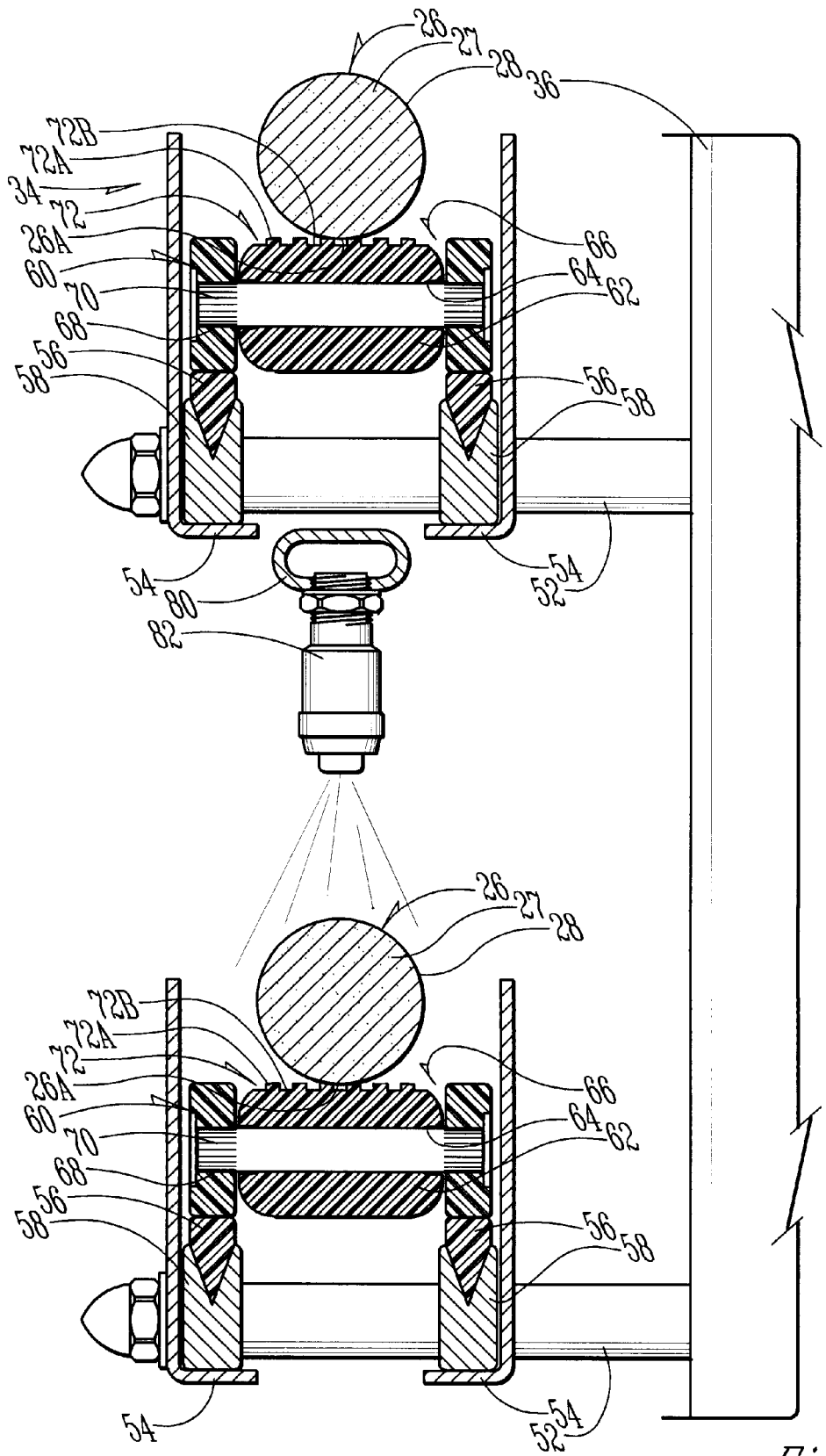
FIG. 5 is an enlarged scale sectional view taken on line 5—5 of FIG. 1.
Figure 6:
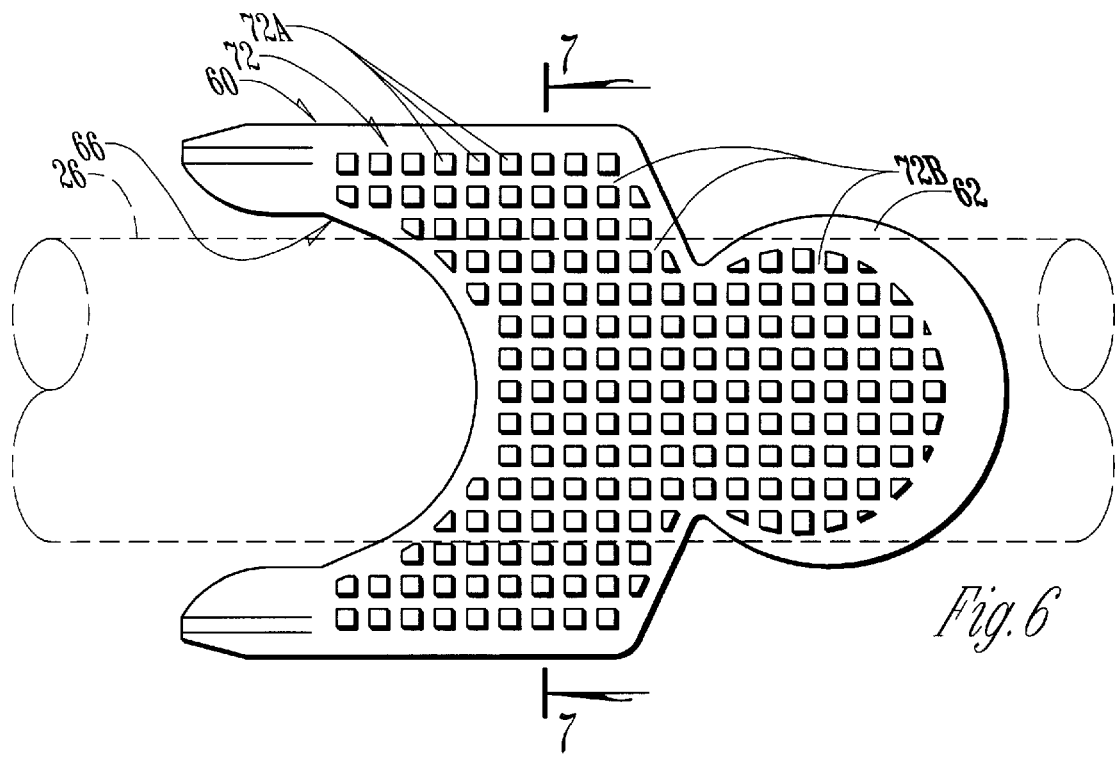
FIG. 6 is an enlarged scale plan view of a conveyor link.
Figure 7:
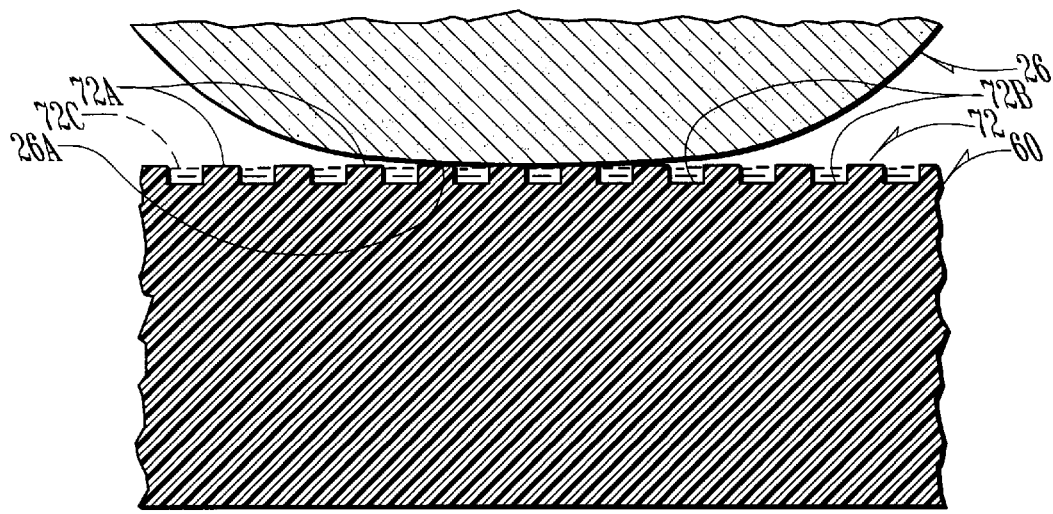
FIG. 7 is a sectional view on line 7—7 of FIG. 6.

The numeral 10 designates an existing coextruding machine suitable for the conveyor of this invention. The numeral 12 is a meat emulsion hopper using a meat pump machine for pumping emulsified meat. A collagen gel pump 16 has a hopper 18 for receiving the collagen gel. It is connected by conduit 19 to inline mixer 20. A tube 22 connects the inline mixer 20 to the coextruder 24 which is capable of extruding a cylindrical strand of meat emulsion with a collagen gel material on the outer surface thereof. Coextruder 24 is connected by tube 25 to the meat pump 14. The conventional coextruded strand of sausage 26 (FIG. 5) has an emulsified meat material core 27 with the collagen gel comprising the outer surface 28 thereof. Liquid smoke from liquid smoke dispenser 30 is used as a coagulation material to coagulate the outer surface 28 of sausage strand 26. The liquid smoke dispenser 30 can be connected in any convenient way such as by line 32 to the inline mixer 20 (FIG. 1).

A conveyor 34 is mounted on frame 36 and has a point of beginning 38 adjacent the output end of coextruder 24, and a discharge station 40 which is located outwardly and downwardly from the point of beginning 38. Three sprockets 42 are rotatably mounted on frame 36 and are adapted to rotate about a horizontal axis. As best shown in FIG. 2, two of the sprockets 42 are vertically disposed with respect to each other below point of beginning 38, and the third sprocket 42 is located on the outer end of a conveyor adjacent discharge station 40.

Two vertical shafts 44 are mounted on opposite ends of frame 36. Each shaft 42 has five rotatably disposed sprockets 46 thereon which are adapted to rotate on shafts 44 about the vertical axis of the shafts. Each set of five sprockets 46 are located in the same parallel plane as one each of the sprockets on the opposite vertical shaft 44. An endless conveyor belt 48 is circuitiously mounted on the sprockets 42 and 46. An infrared heater 50 is mounted on frame 36 adjacent discharge station 40. A drive 51 for the conveyor belt 48 is located adjacent the discharge station 40 as best shown in FIGS. 1 and 2.

Belt 48 (FIG. 5) is disposed between a plurality of elongated L-shaped guides 54 which are secured to frame 36. Elongated rails 56 mounted on bearings 58 extend longitudinally through the guides. With reference to FIG. 4, the conveyor belt 48 is comprised of a plurality of belt segments or links 60 which each have a circular male member 62 at one end thereof with a laterally extending connection slot 64. A semi-circular female slot 66 appears at the end of belt segment 60 opposite to circular male member 62. Laterally extending apertures 68 extend through the semi-circular female slot 66. Laterally extending pins 70 extend through the aperture 68 and thence through the slot 64 to interconnect the belt segments 60. The apertures 28 permit the belt segment 60 to pivot about the longitudinal axes of aperture 68, and the slot 64 permits the belt segments to have limited pivoted movement about a vertical axis passing through the slot 64 so that the conveyor belt can reverse its direction of travel around sprockets 48. The center portion of each belt segment 60 is comprised of a flat supporting surface 72 which is in the same plane as the upper surfaces of the circular male member 62 and the body of the belt segment surrounding the female slots 66. The support surface 72 has a plurality of projections 72A which are preferably aligned in rows to create channels 72B therebetween. The projections 72 are approximately 0.063 in. square, and 0.045 inches high, thus making channels 72B 0.063 in. wide and 0.045 inches deep. A strand 26 1 inch in diameter usually will have its lower surface 26A touching 4–6 members 72A and will span 4–6 channels 72B. When the channels 72B are filled with brine, the brine 72C in the channels will engage the bottom surface 26A of sausage strand 26.

With reference to FIG. 2, a brine circuit system 74 includes a brine pump 76. A plurality of miscellaneous control valves 78 are imposed in the brine circuit 74 to selectively control the flow of brine through the system. A fluid line 80 extends from pump 76 and includes a plurality of spaced nozzles 82 which, as discussed hereafter, are located in a plurality of locations on frame 36 directly above the conveyor belt 48 (see FIG. 5) to dispense a spray of fluid brine on the strand of sausage 26.

Brine circuit 74 includes a brine tank 84 which is connected to a brine collection tray 86 located below the various tiers of conveyor belt 48.

A controller 88, such as a computer or the like, is mounted on frame 36 and is connected by line 90 to conveyor drive 51 and is connected by line 92 to coextruder 24. The purpose of controller 88 is to coordinate the discharge speed of the extruded strand of sausage 26 with the speed of the conveyor belt 48 so that the speed of the sausage strand upon discharge is substantially the same speed as the conveyor imparts to the sausage strand once the strand is being conveyed. This prevents the sausage strand from being stretched so as to distort its cross-sectional section while being processed.

In operation, the meat emulsion hopper 12 is charged with a supply of meat emulsion, and the collagen hopper 18 is charged with a quantity of collagen gel. Similarly, the liquid smoke dispenser 30 is charged with liquid smoke so that the liquid smoke is combined with the collagen gel within inline mixer 20.

The mixture of liquid smoke and collagen gel is transmitted through tube 22 to coextruder 24 which conventionally discharges the sausage strand 26 with the center core of meat emulsion 27 in an outer surface comprised of the collagen gel and liquid smoke. The liquid smoke is adapted to coagulate the collagen gel in the presence of air and a brine solution. The strand of sausage 26 is discharged from extruder 24 onto the point of beginning of the conveyor 34. The sausage strand progresses along the moving conveyor belt 48 of the conveyor 34 and is moved under a plurality of the nozzles 82 which spray a quantity of brine on the moving sausage strand.

The controller 88 coordinates the speed of the rate of discharge of the strand of sausage 26 with the longitudinal movement of the conveyor belt 48 as dictated by the conveyor drive 51 so that the elongated strand will not be stretched during its movement.

It should also be noted that the sausage strand rotates slightly from side to side about its longitudinal axes as it progresses downwardly with the conveyor belt 48. This is particularly induced by the configuration of the conveyor belt as it reverses direction. See FIG. 3. This rotation of the sausage strand about its longitudinal axis better permits the brine sprayed from the nozzles 82 to contact all of the outer surface 28 of the sausage strand 26 to enhance the coagulation thereof. To the extent that the strand does not rotate, the brine-filled channels 72B help the brine to engage the bottom surface 26A of the strand.

The infrared heater 50 emits heat to stimulate the coagulation of the outer surface 28 as the sausage strand moves therethrough on the conveyor belt 48.

The excess brine from nozzles 82 flows downwardly into the brine collection tray 86, and thence into brine tank 84 wherein the excess brine is recirculated through the system.

The controller 88 is also adapted to cause the strand of sausage 26 to move from the point of beginning 38 to the discharge station 40 in approximately 40 seconds to permit the brine sufficient time to coagulate the outer surface 28 of the sausage strand 26.

When the sausage strand reaches the discharge station 40, the outer surface 28 is sufficiently coagulated to provide strength to the sausage strand where it is discharged into any suitable collection receptacle. The sausage strand can also be formed into a plurality of lengths at that location by conventional structure.

The conveyor elements of this invention including the protrusion elements 72A, and the brine-filled channels 72B, enhance the ability of the brine to engage the lower surface 26A of the sausage strand 26 so that the surface 26A can be adequately treated by the brine solution. These protrusion elements can assume a variation of shapes and spacing, without departing from the invention.

It is therefore seen that the conveyor of this invention will achieve at least their principal objectives.

What is claimed is:

1. A conveyor for moving an extruded strand of sausage from an extruding machine, and for coagulating the outer surface of said strand of sausage, comprising, a frame, a continuous conveyor on said frame sloping downwardly from a point of beginning to a discharge station, and thence back to said point of beginning, a brine fluid circuit disposed on said frame above said conveyor with a plurality of discharge nozzles thereon to spray brine on a strand of sausage moving with said conveyor, said conveyor being comprised of a plurality of link elements pivotally secured together, each link element having a generally flat supporting surface, said supporting surface having a plurality of protruding support elements thereon with liquid channels therebetween so that said strand of sausage can have a lower surface supported by a plurality of said support elements whereupon brine fluid in said channels can contact a lower surface of said strand of sausage above said channels.

2. The conveyor of claim 1 wherein said protruding spaced support elements are arranged in longitudinally and laterally spaced rows to create elongated channels therebetween.

3. A conveyor for moving an extruded strand of sausage from an extruding machine, and for coagulating the outer surface of said strand of sausage, comprising:

a frame, a continuous conveyor on said frame extending from a point of beginning to a discharge station, and thence back to said point of beginning, a brine fluid circuit disposed on said frame above said conveyor with a plurality of discharge nozzles thereon to spray brine on a strand of sausage moving with said conveyor, said conveyor being comprised of a plurality of link elements pivotally secured together, each link element having a generally flat supporting surface, said supporting surface having a plurality of protruding support elements thereon with liquid channels therebetween so that said strand of sausage can have a lower surface supported by a plurality of said support elements whereupon brine fluid in said channels can contact a lower surface of said strand of sausage above said channels.

4. The conveyor of claim 3 wherein said protruding spaced support elements are arranged in longitudinally and laterally spaced rows to create elongated channels therebetween.

* * * * *